US009910992B2

(12) United States Patent
Simpson et al.

(10) Patent No.: US 9,910,992 B2
(45) Date of Patent: *Mar. 6, 2018

(54) PRESENTATION OF USER INTERFACE ELEMENTS BASED ON RULES

(71) Applicant: HEWLETT-PACKARD DEVELOPMENT COMPANY, L.P., Houston, TX (US)

(72) Inventors: Shawn Morgan Simpson, Alpharetta, GA (US); Kirill Mendelev, Alpharetta, GA (US); Philip Edward Hamer, Alpharetta, GA (US)

(73) Assignee: EntIT Software LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/763,172

(22) PCT Filed: Feb. 25, 2013

(86) PCT No.: PCT/US2013/027634
§ 371 (c)(1),
(2) Date: Jul. 24, 2015

(87) PCT Pub. No.: WO2014/130048
PCT Pub. Date: Aug. 28, 2014

(65) Prior Publication Data
US 2015/0356302 A1 Dec. 10, 2015

(51) Int. Cl.
*G06F 21/57* (2013.01)
(52) U.S. Cl.
CPC ...... *G06F 21/577* (2013.01); *G06F 2221/033* (2013.01)

(58) Field of Classification Search
CPC ............ G06F 21/577; G06F 2221/033; G06F 17/30893; G06F 17/30896;
(Continued)

(56) References Cited

U.S. PATENT DOCUMENTS 6,687,874 B2 * 2/2004 Burgess ................. G06F 17/24
709/217
7,039,899 B1 5/2006 Quiroga
(Continued)

FOREIGN PATENT DOCUMENTS

CN 101529362 B 9/2009
CN 101689200 A 3/2010
(Continued)

OTHER PUBLICATIONS

Auger, R., Web Application Security Scanner Evaluation Criteria, Retrieved from the Internet: <http://projects.webappsec.org/w/page/13246986/Web%20Application%20Security%20Scanner%20Evaluation%20Criteria> [retrieved Jan. 8, 2013], 17 pages.
(Continued)

*Primary Examiner* — Abu Sholeman

(57) ABSTRACT

Example embodiments disclosed herein relate to present part of a web application with one or more user interface elements of the part highlighted based on updated rules. A web application is loaded in a browser layout engine. User actions are simulated on user interface elements of the web application to update the rules. The part of the web application is presented with one or more user interface elements highlighted.

16 Claims, 7 Drawing Sheets

(58) Field of Classification Search
CPC .......... G06F 17/30906; G06F 17/5009; G06F 17/30961; G06F 17/577
USPC .......................................................... 726/25
See application file for complete search history.

(56) References Cited

U.S. PATENT DOCUMENTS

| | | | |
|---|---|---|---|
| 7,054,952 B1 | 5/2006 | Schwerdtfeger | |
| 7,552,109 B2 | 6/2009 | Balasubramanian et al. | |
| 7,913,163 B1* | 3/2011 | Zunger | G06F 17/30864 715/234 |
| 8,332,763 B2* | 12/2012 | Zhang | G06F 17/30893 715/255 |
| 8,555,391 B1* | 10/2013 | Demir | H04L 67/20 713/187 |
| 8,601,586 B1 | 12/2013 | Boutros | |
| 8,713,427 B2* | 4/2014 | Im | G06F 17/227 715/234 |
| 8,752,183 B1 | 6/2014 | Heiderich | |
| 8,775,563 B2* | 7/2014 | Allsop | G06F 17/30867 705/5 |
| 8,793,806 B1* | 7/2014 | Truong | H04L 63/101 713/182 |
| 9,391,832 B1 | 7/2016 | Song | |
| 9,405,833 B2* | 8/2016 | Tuttle | G06F 17/3089 |
| 9,699,142 B1 | 7/2017 | Allen | |
| 2002/0010855 A1* | 1/2002 | Reshef | G06F 21/554 713/164 |
| 2003/0120719 A1* | 6/2003 | Yepishin | G06F 17/30899 709/203 |
| 2003/0159063 A1 | 8/2003 | Apfelbaum et al. | |
| 2003/0192026 A1* | 10/2003 | Szepesvary | G06F 8/30 717/100 |
| 2004/0111727 A1 | 6/2004 | Schwarzbauer et al. | |
| 2006/0070075 A1* | 3/2006 | Rodionov | H04L 67/125 718/102 |
| 2006/0279571 A1 | 12/2006 | Mori et al. | |
| 2008/0120305 A1 | 5/2008 | Sima et al. | |
| 2008/0148377 A1* | 6/2008 | Kumar | G06F 21/31 726/9 |
| 2008/0148408 A1 | 6/2008 | Kao et al. | |
| 2009/0271474 A1* | 10/2009 | Fu | G06Q 10/10 709/202 |
| 2010/0077483 A1* | 3/2010 | Stolfo | G06F 21/554 726/24 |
| 2010/0094860 A1* | 4/2010 | Lin | G06Q 30/02 707/709 |
| 2010/0174774 A1 | 7/2010 | Kern | |
| 2010/0198799 A1 | 8/2010 | Krishnan et al. | |
| 2010/0211865 A1 | 8/2010 | Fanning et al. | |
| 2010/0263051 A1* | 10/2010 | Ngalle | G06F 21/51 726/26 |
| 2010/0293616 A1 | 11/2010 | Young | |
| 2011/0015917 A1 | 1/2011 | Wang et al. | |
| 2011/0078556 A1* | 3/2011 | Prasad | G06F 8/10 715/234 |
| 2011/0159179 A1 | 6/2011 | Chapman | |
| 2011/0161486 A1 | 6/2011 | Podjarny et al. | |
| 2011/0173526 A1 | 7/2011 | Schwarzbauer et al. | |
| 2011/0214174 A1* | 9/2011 | Herzog | H04L 63/0807 726/10 |
| 2011/0239104 A1* | 9/2011 | Prasad | G06F 11/3684 715/234 |
| 2011/0252405 A1 | 10/2011 | Meirman et al. | |
| 2012/0016975 A1* | 1/2012 | Rothschild | G06Q 30/0277 709/223 |
| 2012/0017274 A1 | 1/2012 | Schrecker | |
| 2012/0023487 A1* | 1/2012 | Letca | G06F 11/3466 717/130 |
| 2012/0030305 A1 | 2/2012 | Marquess et al. | |
| 2012/0174075 A1 | 7/2012 | Carteri et al. | |
| 2012/0210236 A1 | 8/2012 | Prasad | |
| 2013/0111595 A1* | 5/2013 | Amit | G06F 21/52 726/25 |
| 2013/0227396 A1* | 8/2013 | Chinnathambi | G06F 17/212 715/235 |
| 2013/0254548 A1* | 9/2013 | Greene | G06F 21/6227 713/189 |
| 2013/0254855 A1* | 9/2013 | Walters | G06F 21/60 726/5 |
| 2014/0075563 A1* | 3/2014 | Simpson | G06F 21/577 726/25 |
| 2014/0123295 A1 | 5/2014 | Kuykendall | |
| 2015/0356302 A1* | 12/2015 | Simpson | G06F 21/577 726/25 |
| 2016/0034690 A1* | 2/2016 | Kejriwal | G06F 21/577 726/25 |
| 2016/0078146 A1* | 3/2016 | Simpson | G06F 8/38 715/234 |
| 2016/0241582 A1* | 8/2016 | Boia | G06F 21/577 |

FOREIGN PATENT DOCUMENTS

| | | |
|---|---|---|
| CN | 101742031 B | 6/2010 |
| CN | 101808093 B | 8/2010 |
| CN | 102523288 | 6/2012 |
| CN | 102918491 | 2/2013 |
| EP | 1235144 | 8/2002 |
| EP | 1235144 A2 | 8/2002 |
| WO | WO-2006058075 A1 | 6/2006 |
| WO | 2007009210 | 1/2007 |

OTHER PUBLICATIONS

Doupe, et al., Enemy of the State: a State-aware Black-box Web Vulnerability Scanner, Retrieved from the Internet: < http://dl.acm.org/citation.cfm?id=2362819 >, Sep. 20, 2012, 16 pages.
IBM, Rational AppScan® Standard Edition, 2009, Version 7.8, Retrieved from the Internet: <http://www.itsecurity.ucla.edu/documents/appscan/standard/AppScan%20Standard%20v7.8%20-%20Full%20User%20Guide.pdf> [retrieved on Jan. 8, 2013], 246 pages.
International Search Report & Written Opinion, Oct. 28, 2013, PCT Patent Application No. PCT/US2013/023655, 9 pages.
International Search Report and Written Opinion, Nov. 26, 2013, PCT Patent Application No. PCT/US2013/027634, 10 pages.
Microsoft, Plan crawling and federation in SharePoint Server 2013; Jul. 16, 2012, Retrieved from the Internet: <http://technet.microsoft.com/en-us/library/jj219577.aspx> [retrieved on Jan. 8, 2013], 6 pages.
Unknown, Sharepoint 2010 Farm and Application Configuration (part 1)—Farm-wide Search Settings & Managing Crawler Impact Rules, Retrieved from the Internet: <http://allcomputers.us/windows_server/sharepoint-2010---farm-and-application-configuration-(part 1)---farm-wide-search-settings---managing-crawler-impact-rules.aspx> [retrieved on Jan. 8, 2013], 4 pages.
Extended European Search Report, EP Application No. 13875944.4, dated Aug. 25, 2016, pp. 1-6, EPO.
Extended European Search Report, EP Application No. 13874102.0, dated Aug. 1, 2016, pp. 1-10, EPO.

* cited by examiner

PRESENTATION OF USER INTERFACE ELEMENTS BASED ON RULES

BACKGROUND

Software security testing is used to identify vulnerabilities in an application such as a Web application. Traditional black-box security testing for Web-based software works by using a security testing application, often referred to as a scanner, which poses as an attacker. The scanner explores an Application Under Test (AUT) by making HTTP requests and evaluating the HTTP responses or the lack thereof in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

Figure 1A:
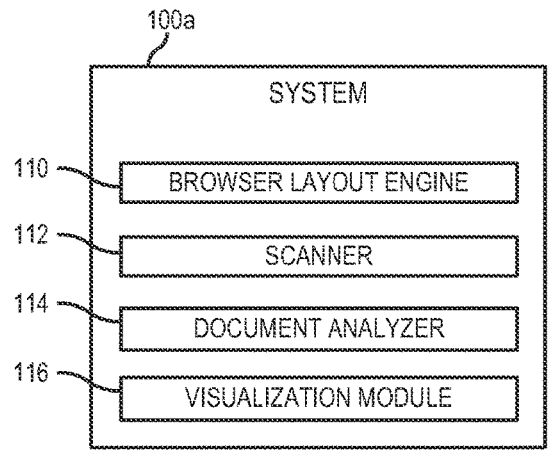
FIGS. 1A and 1B are block diagrams of systems capable of presenting user interface elements based on rules, according to various examples.

Embodiments described herein provide techniques for performing testing of applications, such as web applications. When a company desires to know how secure a web application the company has in production is or going to be put into production, the company often uses a security testing solution such as a penetration testing solution (e.g., use of a scanner), fuzz testing, vulnerability testing, software security testing, website security testing, combinations thereof, or the like. The company may wish to use a copy of the application in production as an Application Under Test (AUT).

Automatic dynamic web application security scanners explore the AUT before attacking it. This process can be termed "crawling." Crawling of an AUT can be done through analysis of web application's HyperText Markup Language (HTML) and executing the AUT's code within a controlled environment of a web browser layout engine, for example, a web browser layout engine embedded within a web application scanner.

As use of Web 2.0 applications grows, their complex structure prevents HTML page analysis and complicates browser-level processing. Many Web 2.0 applications have minimally bootstrapped HTML code, which downloads the main code, for example, JavaScript (JS) code, which operates on the browser's Document Object Model (DOM) and JS structures directly, Asynchronous JS and XML (AJAX) calls, dynamically created links, DOM events, etc. Sometimes as the JS code is run, other HTML documents are not fetched during the application's lifetime.

Simplifying an application's structure to list (e.g., graph or tree) actionable elements following a set of predefined rules, which treat applications written in specific ways differently, can be used to facilitate efficient crawling. Using this approach, support can be provided for additional frameworks (e.g., jQuery, Dojo, etc.) to achieve a higher quality scan of the application and discovering vulnerabilities within previously hidden application slates.

In order to discover the application attack surface, a web application scanner simulates user actions on a web application's UI elements. A DOM analyzer uses rules as further detailed in FIG. 3A to traverse the application's structure and to transform complex DOM into a concise list actionable tokens as further detailed in FIG. 3B. In certain examples, a token represents a DOM element that is a valid target for a mouse or keyboard event or a JS entity that may be invoked, evaluated, or modified in any other way. As such, discovery techniques can be used 10 actually execute web application within controlled browser environment to study DOM elements built by a browser engine. UI-based crawlers then use the rules to recognize actionable elements and simulate user action's on the elements.

However, the approach can be challenging. Event bubbling and propagation within the browser can prevent detection of proper event targets, which may hide some of the actionable elements from the crawler. Further, multi-step sequences of user events required for more complex actions (e.g., drag and drop actions, which uses a mouse down, mouse move, mouse up event sequence) may be difficult to detect observing static structure of the application's DOM. Moreover, it may be desirous that some of the actionable DOM elements are skipped during a scan to avoid disturbing the application's state (e.g., if the scanner hits a logout button during the scan, a change password section, etc.). Further, some DOM elements may lead to a "runaway scan," for example, a scan of a calendar user interface, different articles in a catalogue site, etc. As such, blindly following generic rules to detect actionable elements can lead to a sub-optimal scan that may be too lengthy, disturb an application's state, miss significant parts, etc.

Accordingly, various embodiments are presented to provide an interactive way to visualize crawling tactics chosen by a scanner. Further, the approach allows for modification of these decisions prior to a full scan. One implementation of the approach can include a browser add-on that consumes an external library of crawl-defining rules. These rules can be used to highlight those elements within the application's DOM that are recognized as actionable by the crawler. Because the crawler is directed by the rules, the highlighting is as accurate as a full scan based on the crawler would be.

In one example, a user may interact with the add-on by selecting elements that are missed by the rules, soliciting creation of highly specific rules that complement the existing library of rules being used. Further, the user may introduce user interface exclusions that create rules that prevent the crawler from accessing elements that the user wants to ignore during the scan.

The way rules are created may depend on the selection model the user chooses. For example, the selection model may be as simple as using DOM element's tag, id, or class attributes. In another example, it may be as complex as using sophisticated TruClient-style locators that take many different factors into account while looking for an element, such as the element's properties, content of the text node wrapped by an element (if any), the element's neighbors, etc. By providing a thru-the-scanner view the quality of the first scan can be significantly improved by providing a better user experience.

In certain examples, each rule can include or consist of a rule relevancy predicate that is used to check whether the rule should be activated on a specific frame of the web application. In some examples, the rules can be JS framework-specific, including version of JS being used. In one example, if a rule is active, all selectors for the rule are invoked. Each selector is then used in traversing the web application's DOM and JS structures to return a list of tokens. In another example, if a rule is active, selectors can be determined based on further analysis of the web application (e.g., from a cache of the web application). The further analysis is detailed herein.

In some examples, a selector is a technique or mechanism used to identify elements within a DOM that are of interest. In some examples, selectors can be built into a language used to describe the application, for example, Cascading Style Sheets (CSS) have built-in selectors. In the example of CSS, "." can be used to select classes while "#" can be used to select ids. With this approach, ".role" can be used to select every element in the DOM with a class of "role." In other examples, selectors can be generated by the rules. For example, the rules can write JavaScript or other scripts/code to return a set of selected elements as tokens.

In certain examples, a token represents a DOM element that is a valid target for a mouse or keyboard event or a JS entity that may be invoked, evaluated, or modified in any other way. A token includes a locator (e.g., a locator may be a simple XPath, a TruClient-specific locator, etc.) that can be used to retrieve the element and a list of actions that are permitted for the DOM or JS entity.

The relevant rules can be identified and then the associated selectors can be enabled. The DOM of the web application can then be analyzed using the selectors to generate the tokens. This expands crawl coverage of the application and discovers shorter business process paths within the application. The tokens can be sent to a scanner to scan the web application. During a scan, the tokens can be used by the web application scanner to locate relevant DOM objects/JS entities and activate them. This can be used to determine vulnerabilities and other information about the web application.

Figure 1B:
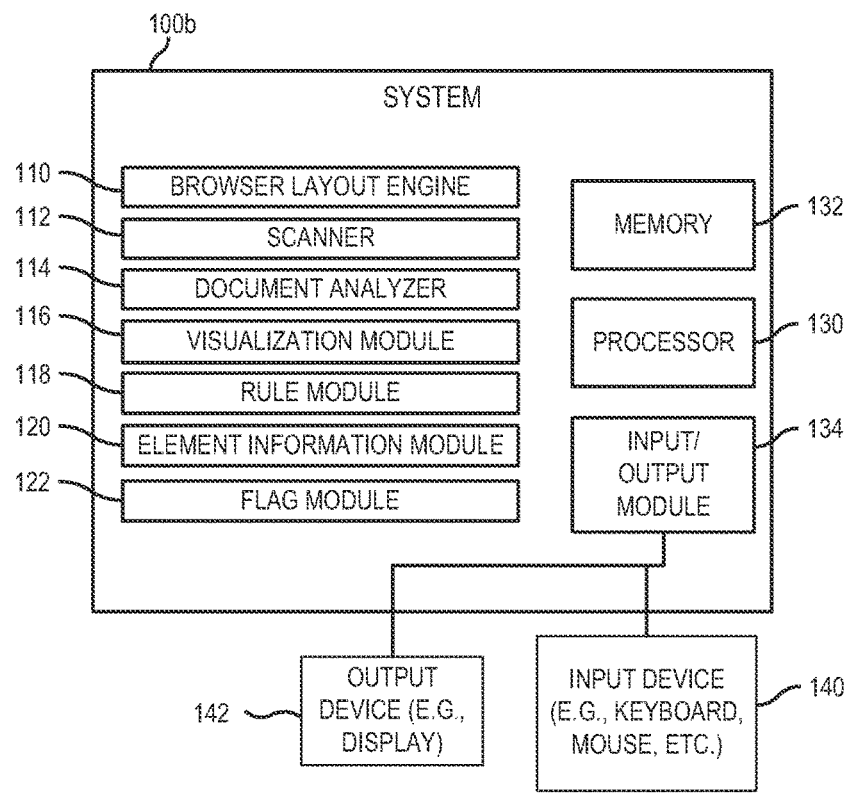

FIGS. 1A and 1B are block diagrams of systems capable of presenting UI elements based on rules, according to various examples. Systems 100a, 100b include components that can be utilized to present and provide interaction with UI elements found using actionable tokens. The respective systems 100a, 100b may be a notebook computer, a desktop computer, a tablet computing system, a wireless device, a server, a workstation, or any other computing device or set of computing devices that is capable of causing presentation of user interface elements.

A browser layout engine 110 can load a web application. The browser layout engine can be, for example, a web browser or a modified browser configured to work as part of a scanner computing system. Examples of web applications include calendar applications, email interfaces, news pages, other content resources such as streaming video, productivity applications, etc.

A scanner 112 can simulate user actions on user interface elements of the web application. During this process, a document analyzer 114 can traverse a structure of the web application based on rules and transform complex DOM of the web application into a set of actionable tokens. This process is further detailed in the description of FIG. 2. During the traversal, the rules can be updated as also further described in FIG. 2. For example, when finding one framework operating on the web application, one or more rules and/or selectors can be enabled/implemented.

In one example, once a set of tokens and/or rules are determined for the web application, the information can be provided to a visualization module 116. In one example, the visualization module 116 can be part of the scanner 112. The visualization module 116 can cause presentation of a part of the web application with one or more user interface elements of the part highlighted based on the set of actionable tokens and/or rules.

In one example, a part of the web application can be represented using one or more pages. Further, in some examples, the visualization module 116 can be implemented as a web browser plugin or a modified web browser that takes into account the rules and/or the tokens. The visualization module 116 can use the rules/tokens to highlight those elements within the application page's DOM that are recognized as actionable by the crawler. Presentation can be caused on a presentation device via an input/output module 134 to an output device 142, such as a projector, a display, etc. In one example, the plugin executes rules identified by the crawler as to be turned on to determine which elements to highlight.

An input module can receive selection input to select a user interface element presented on the web page. In one example, the user interface element is not highlighted. The rule module 118 can generate or modify a rule to enable selection of the user interface element. In one example, an option can be provided to the user to enable finding of that user interface element. In another example, an option can be provided 10 the user to enable finding of other similar user interface elements. With this approach, the rule can transform other user interface elements similar to the selected user interface element into other actionable tokens based on information associated with the selected user interface element. In some examples, the information can include a common classname associated with the selected user interface element and the other elements that would be enabled. In other examples, the information can include attributes, a tag, an identifier, a class, etc. Further, because one or more of the information can be determined automatically, the rule can be automatically generated or modified without additional input.

In another example, a user interface element that is not highlighted is selected. A flag module 122 can be used to flag the user interface element for creating a rule. An element information module 120 can then be used to generate and cause storage of information about the user interface element. Information can include a type associated with the UI element, an access identifier associated with the user interface element, one or more event handlers associated with the user interface element, relationship information within the document object model (e.g., parent, child, sibling, etc.).

This information can then be provided to a developer to generate or modify a rule and/or be used to modify/generate a rule without developer input. An option can also be provided to choose only this UI element or choose similar UI elements. In the scenario that a developer or other person is tasked to provide other information, customize input information can be used, for example, customized information selecting one or more of the stored information associated with the UI element to use for a rule. As such, the rule module 118 can generate or modify a rule to transform other user interface elements similar to the selected UI element into other actionable tokens based on one or more of the type, access identifier, event handlers, relationship information and customized input information.

In another scenario, another one of the user interface elements is chosen. This UI element can be one of the highlighted user interface elements. The rule module can perform one or more tasks on the rules based on the UI element selection. In one scenario, a rule can be modified or generated to exclude the UI element. In another scenario, a rule can be deselected based on the selection. For example, a rule can be set to not interact with or create tokens for one or more of a logout interaction, a calendar interaction, a color palette interaction, or the like.

With these approaches, an input module can receive selection input to select a user interface element of a presented web page. The rule module can use the selection input as an exemplar to create one or more rules for explicit selection or deselection of the respective user interface element during a scan. As noted above, this can be implemented by generating tokens or not generating tokens based on the rules. As noted, the rules can be very specific, for example, specific to a single user interface element, or less specific, for example, specific to a class associated with the user interface element.

In one example, a client can do the selection. For example, a client wishing to test an application can look to make sure that important sections of the web application are test. Further, because this is before the whole scan takes place, it can save time. None, one, or more UI elements can be chosen at a time and one of various options can be used. Rules can be automatically updated and refined, or updated based on additional input.

The visualization module 116 can rerun loading of the webpage with highlighted UI elements based on a new set of rules. As such, a new set of UI elements can be highlighted when presented. After, a scan can be performed using the updated rules and tokens generated from the updated rules. In some examples, the web application is retested starting with a crawl with the new rules and old rules. In other examples, the web application can be re-crawled with only the new rules active to generate additional tokens and/or determine one or more tokens to remove during a scan. The scanner 112 can then scan the web application using the tokens.

In one example, the visualization module 116 is separate from the scanning portion of the system. As such, a rules library created/updated during a crawl of the web application can be saved and sent to the visualization module 116. The visualization module can use the rules library when operating on the web application. The rules library can be modified/updated during the presentation of the portion of the web application. Then, the rules library can be saved, for example, in a configuration file, in an Extensible Markup Language (XML) format, etc. The rules library can then be provided to a scanner to generate tokens and perform the scan. One or more of these features can be implemented on the visualization module 116 and/or scanner.

A processor 130, such as a central processing unit (CPU) or a microprocessor suitable for retrieval and execution of instructions and/or electronic circuits can be configured to perform the functionality of any of the modules 110, 112, 114, 116, 118, 120, 122 described herein. In certain scenarios, instructions and/or other information, such as token information, rules, etc., can be included in memory 132 or other memory. Input/output modules 134 may additionally be provided by the computing system 100b. For example, input devices 140, such as a keyboard, a sensor, a touch interface, a mouse, a microphone, etc. can be utilized to receive input from an environment surrounding the computing system 100b. Further, an output device 142, such as a display, can be utilized to present information to users. Examples of output devices include speakers, display devices, amplifiers, etc. Moreover, in certain embodiments, some components can be utilized to implement functionality of other components described herein.

Each of the modules 110-122 may include, for example, hardware devices including electronic circuitry for implementing the functionality described herein. In addition or as an alternative, each module 110-122 may be implemented as a series of instructions encoded on a machine-readable storage medium of computing system 100 and executable by processor 130. It should be noted that, in some embodiments, some modules are implemented as hardware devices, while other modules are implemented as executable instructions.

Figure 2:
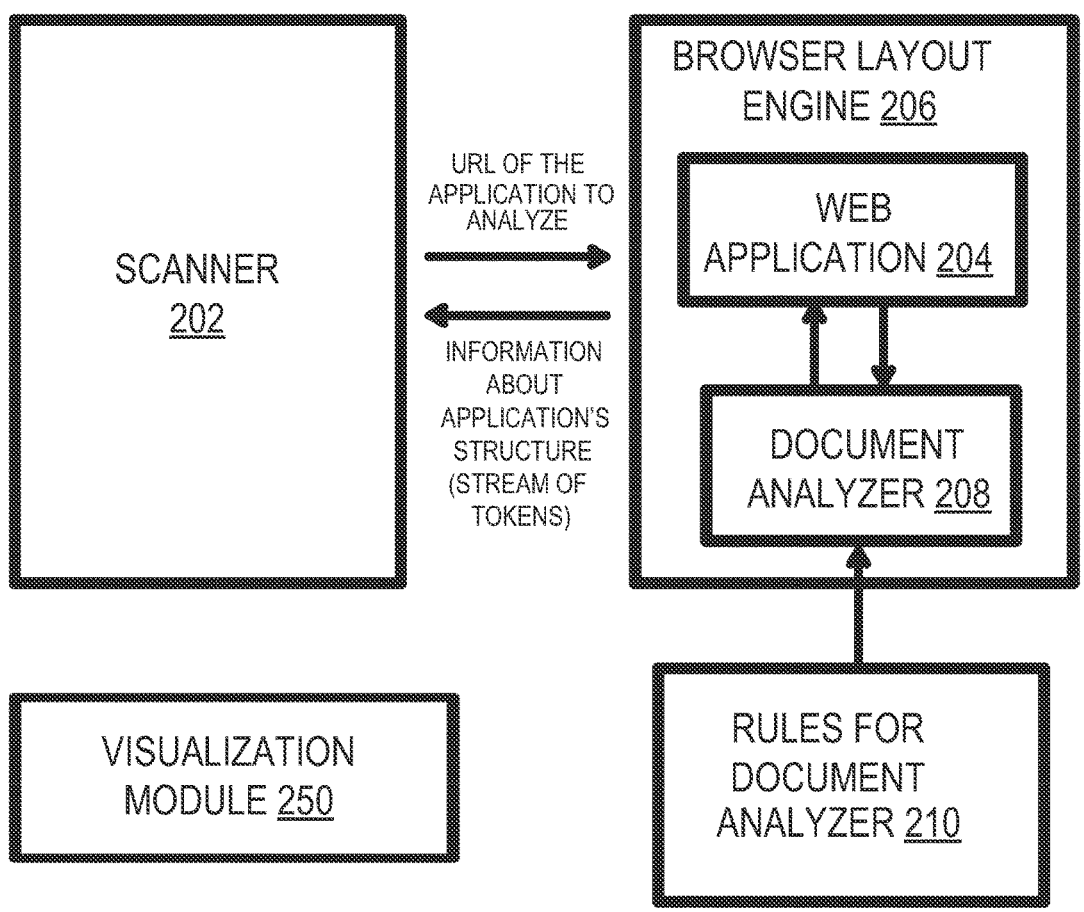
FIG. 2 is a block diagram of a computing system for analyzing the structure of a web application to generate actionable tokens for presentation, according to one example.

FIG. 2 is a block diagram of a computing system for analyzing the structure of a web application to generate actionable tokens for presentation, according to one example. In this example, the computing system 200 can include a scanner 202 to simulate user actions on user interface elements of a web application 204. The web application 204 can be loaded in a browser layout engine 206 and analyzed by a document analyzer 208 according to a set of rules 210. A visualization module 250 can be used to show a user tokens found on a web page during a crawl. The visualization module 250 can also change activate rules, generate rules, deactivate rules, activate exclusionary rules, etc. based on a user interface. One or more components of the computing system 200 can be implemented using at least one processor and memory. Further, one or more computers can be used to implement each of the components or each of the components can be implemented on a single computing system.

A scanner 202 can send a browser layout engine 206 a locator or identifier (e.g., a universal resource locator (URL)) of a web application 204. The browser layout engine 206 can load a web application 204 based on the URL. In some examples, a browser layout engine 206 can be a web browser or a modified browser configured to work as part of a computing system 200. Examples of web applications 204 include calendar applications, email interfaces, news pages, other content resources such as streaming video productivity applications, etc.

A scanner 202 can then simulate user actions on user interface elements of the web application 204. The simulation can be random or based on a predefined set. The simulation can occur while a document analyzer 208 traverses a structure of the web application 204. The simulation can be used to help the document analyzer 208 determine one or more rules to activate to generate actionable tokens. As such, the document analyzer 208 traverses the structure of the web application 204 based on the rules to transform complex DOM of the web application 204 into a set of actionable tokens. The respective actionable tokens can include a portion of the web application that can change a user interface presented based on the web application 204. Examples of portions of the web application that can change a user interface can include targets for keyboard events, targets for click events, other actionable elements, etc. In some examples, actionable elements can include JavaScript objects.

In one example, the document analyzer 208 can determine, from the simulated actions, that a particular type of framework is present on the web application 204. In one example, a framework is an abstraction in which software providing generic functionality can be selectively changed by user code to provide application specific software. This can occur by determining that a selector associated with the framework is present using the simulated actions. Multiple frameworks can be determined based on this approach. Examples of web frameworks include jQuery, YUI Lobrary, Dojo Toolkit, MooTools, Prototype JS Framework, Ajax, Web Accessibility Initiative (WAI)-Accessible Rich Internet Applications (ARIA), and Flash. Frameworks can further be granulated into versions because version changes can affect capabilities and selectors associated.

A set of selectors can be enabled for each framework identified. In one example, some default selectors can also be enabled. In another example, when a framework is identified all associated selectors can be enabled. In yet another example, when a selector associated with the framework is identified, the framework is identified.

Moreover, selectors can be filtered based on content that can be searched about the web application 204. For example, knowing the way jQuery stores information about selectors, the document analyzer 208 can obtain a list of selectors by querying jQuery's cache structure. The cache structure can change based on jQuery release.

In one example, to find the associated selectors, the document analyzer can evaluate JS code of jQuery.cache [window.document[jQuery.expando]]. The result can be an array of JS objects containing selectors for the DOM elements that are valid targets for mouse and/or keyboard events. This example can be based on jQuery 1.6. In jQuery 1.7, the internal structure is changed, thus, more complicated JS code can be written to get the associated elements. This type of code can be written specifically for specific types of frameworks. In certain examples, jQuery may be referred to as a framework and 1.6 and 1.7 referred to as versions or types of the framework. When a particular framework is found, the web application 204 can be analyzed for actionable tokens based on the specifics of the framework. Other approaches, such as processing of the web application code, can be sued to determine the presence of a particular framework. Moreover, rules for the document analyzer 208 can be implemented to automatically detect one or more of the frameworks and fetch a list of relevant elements.

While analyzing the web application 204, more and more selectors are determined. As noted, the rules can be used to determine selectors that are generic, framework specific, or implementation specific (e.g., ones pulled out of cache). Then, the document analyzer 208 can use a tokenizing feature to attempt to find a role and location of activated selectors. Using the selectors, the document analyzer 208 and/or scanner 202 can look for tokens on the web application 204. As noted above, in certain examples, a token represents a DOM element that is a valid target for a mouse or keyboard event or a JS entity that may be invoked, evaluated, or modified in any other way. A set of tokens can be found for each of the selectors. In some examples, the set can be empty. The tokens can include a locator of the token and one or more roles or actions that can be performed on/by the token.

Thus, when implemented, the rules can activate at least one selector and the at least one selector can return at least one actionable token. Moreover, the respective actionable tokens can include an associated locator and a set of permitted actions associated with the respective actionable token. Further, when the document analyzer 208 determines that a particular type of code is executable on the web application (e.g., determination of a framework), the document analyzer 208 can determine at least one of the permitted actions based on the particular type of code (e.g., framework). This can occur, for example, by enabling associated selectors and then attempting to find tokens and elements based on the selectors.

As shown, the set of tokens can be sent to a visualization module 250. The visualization module 250 can load the web application in a browser layout engine. The visualization module 250 can then present a part of the web application (e.g., a page or link) with one or more user interface elements of the part highlighted based on the set of actionable tokens and rules. This can be done by traversing the part with the rules/tokens in place and then highlighting the sections based on locator information associated with the respective tokens found on the part. In some examples, the visualization module 250 can be implemented as a plugin on a web browser. As such, the web page/web application information and/or the token/rules information can be transferred to the visualization module 250 that may be away from other components of the system 200, such as the scanner or document analyzer.

Further, as noted above, input can be received to generate or modify rules by interacting with one or more of the user interface elements shown. In one example, the user interface element is already highlighted. This UI element is selected. The selection may be used to create an exclusion to exclude that specific UI element and/or UI elements like that UI element. Parameters and/or attributes can be selected to determine what UI elements are like the UI element.

Moreover, in one example, the UI element that is selected is not highlighted. The UI element can become highlighted based on the selection. When highlighted, a rule can be created and/or activated based on an analysis of the UI element. The rule may also be customizable. For example, the rule can be for only the specific element in a particular location, for the UI element anywhere, for UI elements sharing particular attributes, lags, identifiers, features, classnames, etc.

A processor, such as a central processing unit (CPU) or a microprocessor suitable for retrieval and execution of instructions and/or electronic circuits can be configured to perform the functionality of any of the components described herein. In certain scenarios, instructions and/or other information, such as tokens, web applications, rules, etc., can be included in memory. Each of the components may include, for example, hardware devices including electronic circuitry for implementing the functionality described herein. In addition or as an alternative, each component may be implemented as a series of instructions encoded on a machine-readable storage medium and executable by a processor. It should be noted that, in some embodiments, some modules are implemented as hardware devices, while other modules are implemented as executable instructions.

Figure 3A:
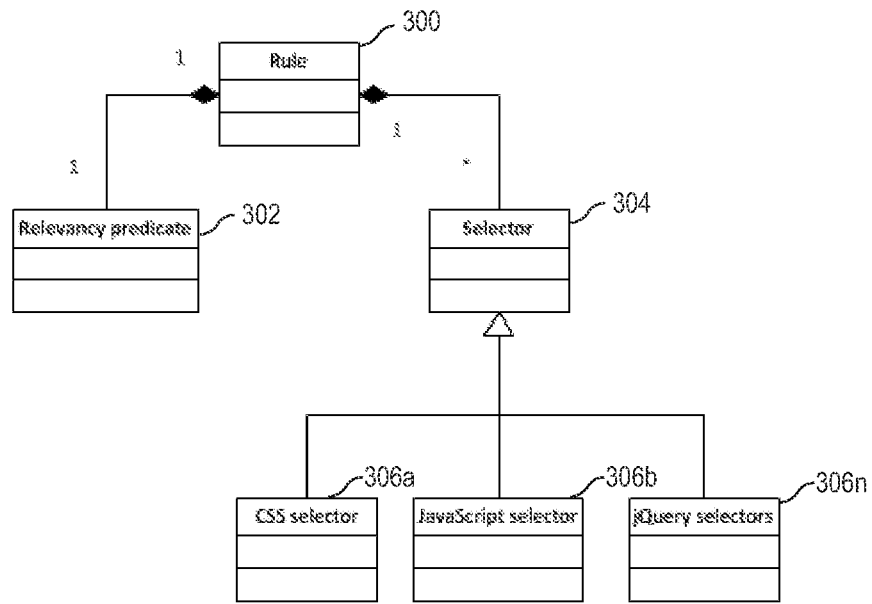
FIGS. 3A and 3B are block diagrams of rules and tokens, according to various examples.
Figure 3B:
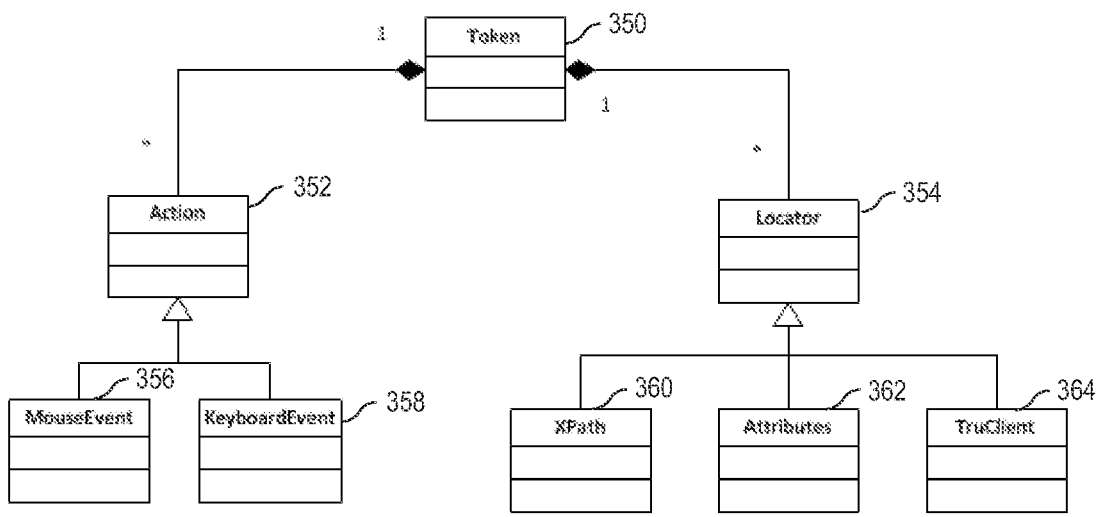

FIGS. 3A and 3B are block diagrams of rules and tokens, according to various examples. FIG. 3A shows a rule object 300. The rule object 300 can be a structure, a class, etc. Each rule can be associated with a relevancy predicate 302 and a selector 304. The selector 304 can include a set of one or more selectors 306a-306n. Selectors 304, 306a-306n examine the DOM and return sequences of actionable DOM entities. Not all of the selectors 306a-306n need be associated with a single rule. The relevancy predicate 302 is used to activate or deactivate the rule. In one example, crawling from a scanner while a document analyzer is executing on a web application can be used to determine whether a rule is relevant. In some examples, fingerprints can be left by one or more frameworks used on the web application. This can be analyzed to determine which rules are relevant to an application. In other examples, a scanner can crawl the application and randomly select an object on the application. The object can be analyzed to determine if a rule is relevant. Examples of selectors include a CSS selector 306a, a JavaScript selector 306b, and jQuery selectors 306n. In one example, a rule can be associated with a particular type of jQuery version. As such, when a rule is considered relevant, a jQuery cache can be examined to determine selectors to enable.

FIG. 3B shows a token object 350. The token object 350 can be a structure, a class, etc. The token object 350 can include one or more actions 352 as well as a locator 354. The token object 350 can define a DOM entity that should be target for action by the scanner. Location determination is possible through various mechanisms, for example, XPath 360, attributes 362 (e.g., ARIA), TruClient 364, etc, Operations or actions can vary based on DOM element. For example, an actionable token can be associated with a mouse event 356, a keyboard event 358, or other user interface changing event (e.g., executing JS code).

Figure 4A:
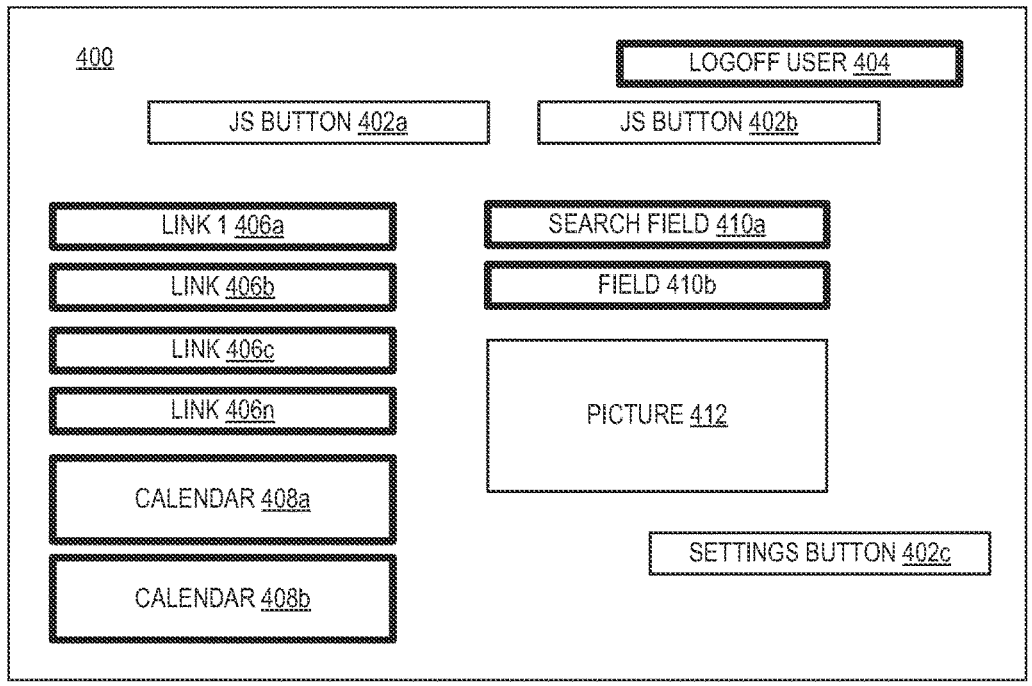
FIG. 4A is a block diagram of a user interface presenting highlighted user interface elements associated with a actionable tokens discovered, according to one example.

Looking at a normal web application in a browser, it can be difficult to see what areas to can be crawled or selected. FIG. 4A is a block diagram of a user interface 400 presenting highlighted user interface elements associated with actionable tokens discovered, according to one example. Elements that have event handlers attached, or those that are recognized in another way (e.g., rules looking at presence of specific attributes, tag names, etc.) are highlighted by the tool.

In the example of FIG. 4A, user interface elements JS Button 402a, 402b, settings button 402c, logoff user 404, links 406a-406n, calendar 408a, 408b, search field 410a, field 410b, picture 412 are present. Here bold user interface elements 404, 406a-406n, 408a, 408b, 410a, and 410b, are highlighted because the UI elements were found using a default set of rules. However, buttons like JS button 402a and settings button 402c were not highlighted. These buttons may lead to significant parts of the application that a scanner would miss using the standard set of rules. Further, logoff user 404 and calendar 428a, b are highlighted. These UI elements, if interacted with, may put the web application in an unwanted state. For example, the calendar 428a may lead to an infinite loop to traverse and the logoff user 404 button may limit the results of the scan because the user was logged off during the scan.

Figure 4B:
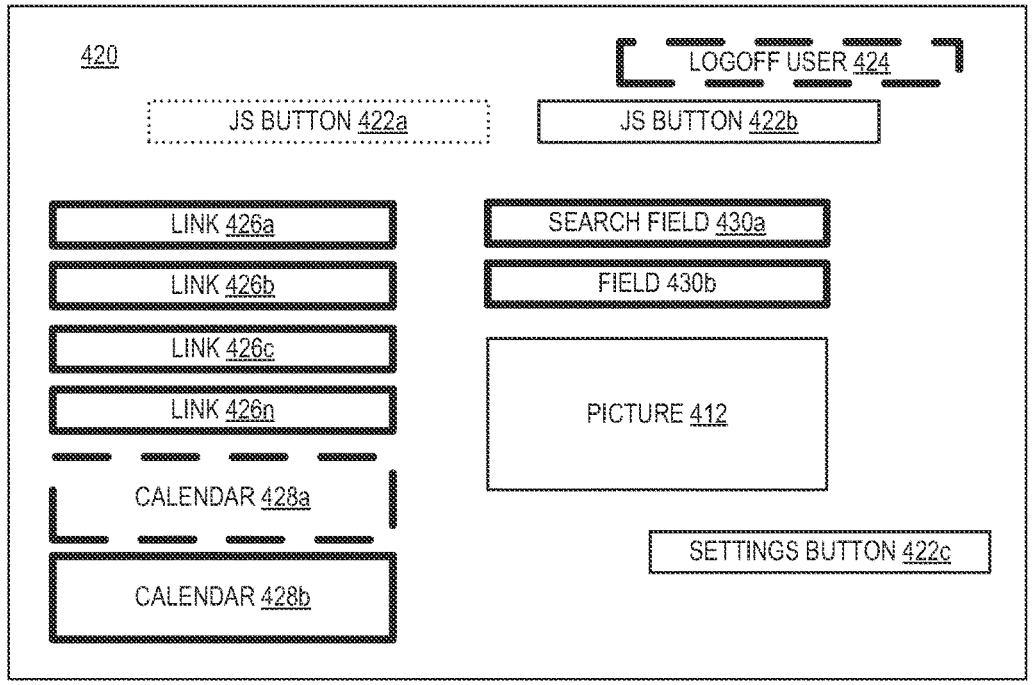
FIG. 4B is a block diagram of a user interface presenting modified highlighted user interface elements associated with a actionable tokens discovered, according to one example.

FIG. 4B is a block diagram of a user interface presenting modified highlighted user interface elements associated with a actionable tokens discovered, according to one example. This user interface 420 includes user interface elements JS Button 422a, 422b, settings button 422c, logoff user 424, links 426a-426n, calendar 428a, 428b, search field 430a, field 430b, picture 412. Here, the user selected logoff user 424, JS button 422a, and calendar 428a. These can be used to modify the set of rules used for generation of tokens by creating rules to exclude and/or include new UI elements in a crawl.

In one example, when a UI element is missing, e.g., JS button 422a, a rule modification add-on detects presence of a common classname associated with the UI element. This can be added to a current rule. For example, a JQuery selectors rule that is used to find other UI elements can be modified to add that classname in its search. Other approaches, as discussed above, can be used to add/remove UI elements.

Figure 4C:
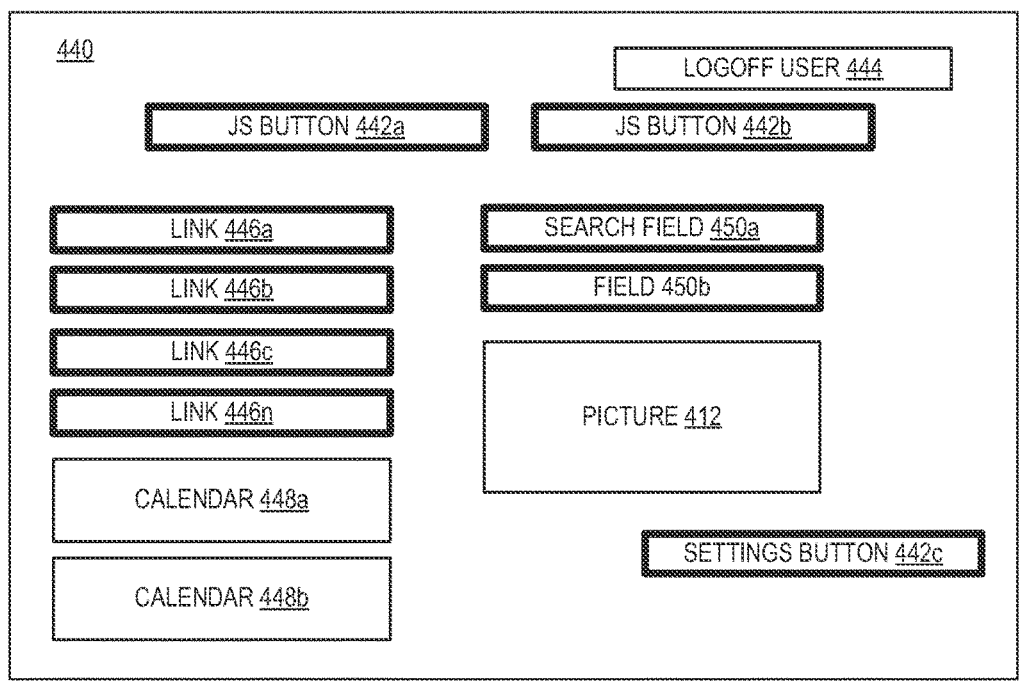
FIG. 4C is a block diagram of a user interface presenting highlighted user interface elements associated with a actionable tokens discovered and based on modified user interlace elements, according to one example.

FIG. 4C is a block diagram of a user interface presenting highlighted user interface elements associated with a actionable tokens discovered and based on modified user interface elements, according to one example. This user interface 440 includes user interface elements JS Button 442a, 442b, settings button 442c, logoff user 444, links 446a-446n, calendar 448a, 448b, search field 450a, field 450b, picture 412. Here, JS button 442a that was selected is highlighted. Additionally, because JS button 442b and settings button 442c share the same class or other identifying information used by the rules, each are also highlighted. Moreover, calendar 448a and 448b are not highlighted because calendar 428a was selected and shares identifying information with calendar 448b that the rule associated to find and exclude. Additionally, the logoff user 424 link was selected and logoff user 444 is deselected. However, the rule was specific to the UI element associated with the logoff function because other links 446a-446n are still highlighted. In one example, the rule can be specific to the UI element by generating locators specific to the UI element.

Additional iterations of selection and rule updates can be done to further refine rules that can be active. Further, the user can click on links and/or buttons to go to other parts of the web application and update rules based on those use interface elements as well.

Figure 5:
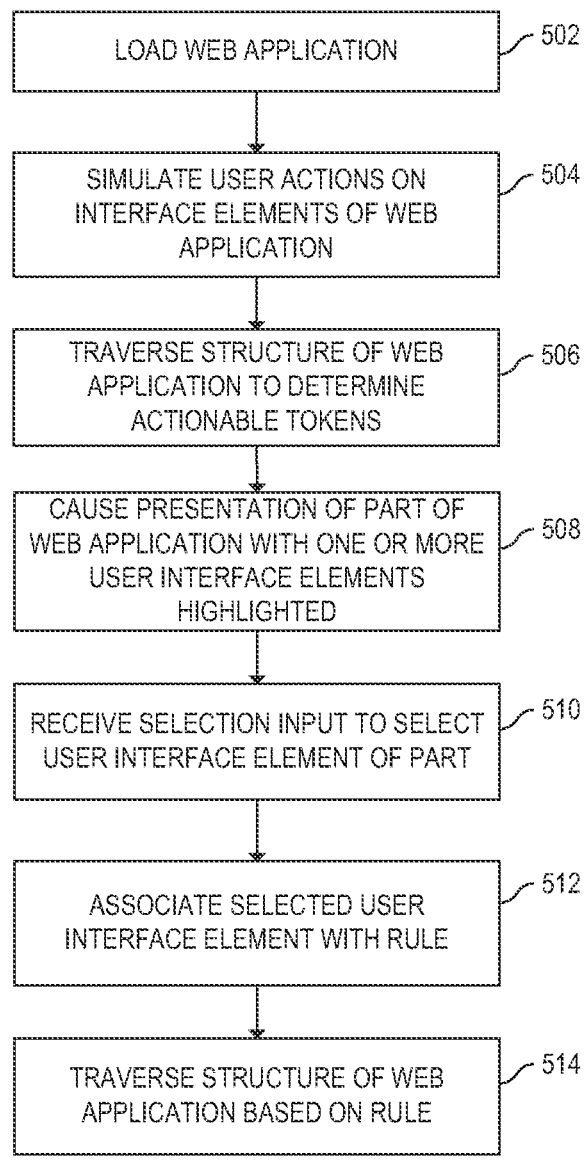
FIG. 5 is a flowchart of a method for causing presentation of part of a web application with user interface elements highlighted based on actionable tokens, according to one example.

FIG. 5 is a flowchart of a method for causing presentation of part of a web application with user interface elements highlighted based on actionable tokens, according to one example. Execution of method 500 can be performed by systems 100, 200, computing device 600, or other suitable components for execution of method 500 can be utilized. Additionally, the components for executing the method 500 may be spread among multiple devices. Method 500 may be implemented in the form of executable instructions stored on a machine-readable storage medium, such as storage medium 620, and/or in the form of electronic circuitry.

During method 500, a web application is loaded into a browser layout engine (502). A scanner can simulate user actions on user interface elements of the web application (504). During the simulation, the structure of the web application can be traversed and analyzed (506). Complex DOM of the web application can be traversed to update the rules used to determine a set of actionable tokens for a scan. The actionable tokens can include a portion of the web application that can change a user interface based on the web application.

At 508, presentation of a part of the web application (e.g., a web page or multiple web pages), is caused. One or more user interface elements of the web page are highlighted based on the rules as further shown in FIGS. 4A-4C. This can additionally or alternatively be done based on a set of actionable tokens found during the crawl. Presentation can be caused at the system used for scanning the web application or another computing system, for example, at a developer's or client's computing device.

At 510, selection input is received to select one or more user interface elements presented on the part (e.g., web page). In one example, the user interface element is not part of the highlighted user interface elements. In another example, the user interface element is part of the highlighted user interface elements.

At 512, the selected user interface element is associated with a rule. The rule can be specific to a single element, or work on multiple elements. Some rules can be to exclude the element or set of elements from being tokenized. Other rules can be to cause other UI elements to be recognized and to generate tokens for the respective other UI elements. As such, the rule can be caused to determine whether other user interface elements similar to the selected user interface element should be transformed into other actionable tokens based on information associated with the selected user interface element. As noted above, the information can include one or more of a type associated with the user interface element, an access identifier associated with the user interface element, one or more event handlers associated with the user interface element, and relationship information (e.g., parent, child, etc.) within the DOM.

In some examples, method blocks 508, 510, and 512 can be performed on other parts of the web application and/or be performed again on the same part of the web application to further refine the rules. At 514, a scanner can traverse the structure of the web application based on the rules and additional user action can be performed to determine additional actionable tokens. A scanner can then perform a scan based on the actionable tokens found.

Figure 6:
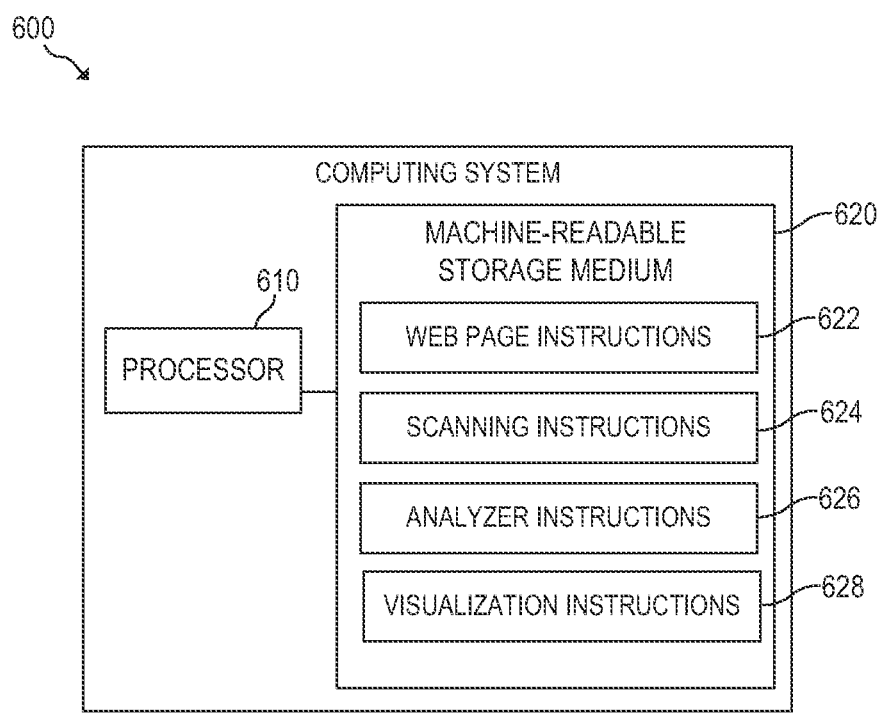
FIG. 6 is a block diagram of a computing system capable of causing presentation of highlighted user interface elements associated with actionable tokens, according to one embodiment.

FIG. 6 is a block diagram of a computing system capable of causing presentation of highlighted user interface elements associated with actionable tokens, according to one embodiment. The computing system 600 includes, for example, a processor 610, and a machine-readable storage medium 620 including instructions 622, 624, 626, 628 for causing presentation of an interactive interface for determining rules to generate actionable tokens. Computing system 600 may be, for example, a notebook computer, a slate computing device, a portable reading device, or any other computing device.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing system 600 includes multiple node devices, or combinations thereof. Processor 610 may fetch, decode, and execute instructions 622, 624, 626, 628 to implement method 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626, 628.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. Further, machine-readable storage medium 620 can be broken into separate portions or memories to be executed on multiple machines or processors. As described in detail herein, machine-readable storage medium 620 may be encoded with a series of executable instructions for causing presentation of part of a web application with one or more user interface elements of the part highlighted based on a set of rules for determining actionable tokens.

Web page instructions 622 can be used to load and utilize a web application. This can be done, for example, in a browser layout engine. Scanning instructions 624 can be executed to simulate user actions on user interface elements of the web application. During the simulation, analyzer instructions 626 can be executed to traverse a structure of the web application based on rules and the user actions to analyze complex DOM of the web application. This can be caused to update the rules, which can be used to determine a set of actionable tokens. The respective actionable tokens can include a portion of the web application that can change a user interface based on the web application.

Visualization instructions 628 can be used to cause presentation of a part of the web application with one or more user interface elements of the part highlighted based on the updated rules to determine the actionable tokens. The presentation can be interacted with. In one example, selection input is used to select a user interface element presented on the part. In this scenario, the selected UI element is not part of the highlighted user interface elements. The selected user interface element is associated with a rule. The rule can be new or old. The rule can be used to transform other user interface elements similar to the selected user interface element into actionable tokens during a scan based on information associated with the selected user interface element. As noted above, the information can include at least one of: a type associated with the user interface element, an access identifier associated with the user interface element, one or more event handlers associated with the user interface element, and relationship information within the DOM.

The presentation and interaction can be performed multiple times to refine rules to be used. Then, the scanning instructions 624 can traverse the web application based on the rule and additional user action 10 analyze the complex DOM to determine actionable tokens. These actionable tokens can be based on the default rules, updated rules, and/or the rule associated with the UI element. Multiple rules can be generated/modified in a similar manner.

With the above approaches, a web application can be scanned in a quick, comprehensive, efficient manner. The web application can further be visualized to show, before the scan is finalized, what user interface elements were found using rules. The rules can then be updated and/or customized. Because of the simplicity of the interface, lay users can click on parts of the web application that the lay users think should be included/excluded and rules can be developed on the fly to catch these UI elements as well as similar elements.

What is claimed is:
1. A system comprising:
a processor; and
a non-transitory computer-readable data storage medium storing instructions executable by the processor to:
load a web application having a complex Document Object Model (DOM);
traverse a structure of the web application based on rules to transform the complex DOM of the web application into a set of actionable tokens representing a portion of user interface elements of the web application;

present a part of the web application with the portion of the user interface elements highlighted;

permit the user to update the rules to selectively add and remove the user interface elements of the web application that are represented by the set of actionable tokens to which the complex DOM of the web application is transformed based on the rules;

discover an application attack surface of the web application used within security vulnerability testing of the web application by simulating user actions on the user interface elements of the web application that are represented by the set of actionable tokens to which the complex DOM of the web application is transformed based on the updated rules;

receive selection input to select a user interface element presented on the part, but not part of the highlighted user interface elements;

flag the user interface element for creating a rule; and generate and cause storage of a type associated with the user interface element, an access identifier associated with the user interface element, one or more event handlers associated with the user interface element, and relationship information within the document object model.

2. The system of claim 1, wherein the instructions are executable by the processor to further:

receive selection input to select a user interface element presented on the part, but not part of the highlighted user interface elements;

generate or modify a rule to transform other user interface elements similar to the selected user interface element into other actionable tokens based on information associated with the selected user interface element.

3. The system of claim 2, wherein the processor is to generate to modify the rule by determining a common classname based on the information and by determining the rule to include the common classname.

4. The system of claim 2, wherein the processor is to generate to modify the rule by generating or modifying the rule based on at least one of attributes, a tag, an identifier, and a class.

5. The system of claim 4, wherein the rule is generated automatically without additional rule input.

6. The system of claim 1, wherein the instructions are executable by the processor to further:

generate or modify a rule to transform other user interface elements similar to the selected user interface element into other actionable tokens based on the type, access identifier, the one or more event handlers, the relationship information, and customized input information.

7. The system of claim 1, wherein the instructions are executable by the processor to further:

receive selection input to select a user interface element presented on the part; and use the selection input as an exemplar to create one or more rules for explicit selection or deselection of the respective user interface element during a security scan.

8. The system of claim 7, wherein the rule is set to not interact with at least one of a logout interaction, a calendar interaction, and a color palette interaction.

9. A non-transitory machine-readable storage medium storing instructions that, if executed by at least one processor of a computing system, cause the computing system to:

load a web application in a browser layout engine, the web application having a complex Document Object Model (DOM);

traverse a structure of the web application based on rules to transform the complex DOM of the web application into a set of actionable tokens representing a portion of user interface elements of the web application;

present a part of the web application with the portion of the user interface elements highlighted;

permit the user to update the rules to selectively add and remove the user interface elements of the web application that are represented by the set of actionable tokens to which the complex DOM of the web application is transformed based on the rules;

discover an application attack surface of the web application used within security vulnerability testing of the web application by simulating user actions on the user interface elements of the web application that are represented by the set of actionable tokens to which the complex DOM of the web application is transformed based on the updated rules;

receive selection input to select a user interface element presented on the part, but not part of the highlighted user interface elements;

flag the user interface element for creating a rule; and generate and cause storage of a type associated with the user interface element, an access identifier associated with the user interface element, one or more event handlers associated with the user interface element, and relationship information within the document object model.

10. The non-transitory machine-readable storage medium of claim 9, further comprising instructions that, if executed by the at least one processor, cause the computing system to:

receive selection input to select a user interface element presented on the part, but not part of the highlighted user interface elements; and associate the selected user interface element with a rule, wherein the rule is caused to transform other user interface elements similar to the selected user interface element into other actionable tokens based on information associated with the selected user interface element.

11. The non-transitory machine-readable storage medium of claim 10, wherein the information includes at least one of: a type associated with the user interface element, an access identifier associated with the user interface element, one or more event handlers associated with the user interface element, and relationship information within the document object model.

12. The non-transitory machine-readable storage medium of claim 10, further comprising instructions that, if executed by the at least one processor, cause the computing system to:

traverse the structure of the web application based on the rule and additional user action to analyze the complex DOM to determine additional actionable tokens.

13. A method comprising:

loading a web application in a browser layout engine, the web application having a complex Document Object Model (DOM);

traversing a structure of the web application based on rules to transform the complex DOM of the web application to determine a set of actionable tokens representing a portion of user interface elements of the web application;

presenting a part of the web application with the portion of the user interface elements highlighted;

permitting the user to update the rules to selectively add and remove the user interface elements of the web application that are represented by the set of actionable tokens to which the complex DOM of the web application is transformed based on the rules;

discover an application attack surface of the web application used within security vulnerability testing of the web application by simulating user actions on the user interface elements of the web application that are represented by the set of actionable tokens to which the complex DOM of the web application is transformed based on the updated rules;

receiving selection input to select a user interface element presented on the part, but not part of the highlighted user interface elements;

flagging the user interface element for creating a rule; and generating and cause storage of a type associated with the user interface element, an access identifier associated with the user interface element, one or more event handlers associated with the user interface element, and relationship information within the document object model.

14. The method of claim 13, wherein the information includes at least one of: a type associated with the user interface element, an access identifier associated with the user interface element, one or more event handlers associated with the user interface element, and relationship information within the document object model.

15. The system of claim 1, wherein the instructions are executable by the processor to further:

identify vulnerabilities within the web application responsive to discovery of the application attack surface.

16. The system of claim 1, wherein the processor is to discover the application attack surface of the web application by executing a web application scanner that simulates the user actions on the user interface elements of the web application according to the updated rules.

\* \* \* \* \*